(12) United States Patent
Rickert et al.

(10) Patent No.: US 9,259,026 B2
(45) Date of Patent: Feb. 16, 2016

(54) METHOD AND DEVICE FOR LEADING MEDIA THROUGH A TREATMENT SYSTEM FOR A LIQUID PRODUCT

(75) Inventors: Ludger Rickert, Freising (DE); Dirk Recktenwald, Bad Abbach (DE); Katja Enzmann, Regensburg (DE)

(73) Assignee: Krones AG, Neutraubling (DE)

( * ) Notice: Subject to any disclaimer, the term of this patent is extended or adjusted under 35 U.S.C. 154(b) by 960 days.

(21) Appl. No.: 13/186,535

(22) Filed: Jul. 20, 2011

(65) Prior Publication Data

US 2012/0021109 A1    Jan. 26, 2012

(30) Foreign Application Priority Data

Jul. 23, 2010  (DE) .......................... 10 2010 038 319

(51) Int. Cl.
 *A23L 2/00* (2006.01)
 *A23L 2/46* (2006.01)
 *A23L 3/18* (2006.01)

(52) U.S. Cl.
 CPC .... *A23L 2/46* (2013.01); *A23L 3/18* (2013.01)

(58) Field of Classification Search
 CPC ............... A23L 2/52; A23L 2/54; A23L 3/18; A23L 2/46; B01F 3/04815; B01F 3/08; B01F 15/00285; B01F 15/0041
 USPC .......................... 426/590, 477, 519, 231, 487
 See application file for complete search history.

(56) References Cited

U.S. PATENT DOCUMENTS

| | | | |
|---|---|---|---|
| 4,599,239 A * | 7/1986 | Wieland et al. | 426/590 |
| 4,857,355 A * | 8/1989 | Gregg | 426/590 |
| 5,058,768 A * | 10/1991 | Lichfield | 222/1 |
| 6,186,193 B1 * | 2/2001 | Phallen et al. | 141/83 |
| 2006/0288874 A1 * | 12/2006 | Ziesel | 99/279 |
| 2007/0006900 A1 * | 1/2007 | Till | 134/22.1 |

FOREIGN PATENT DOCUMENTS

| | | |
|---|---|---|
| CN | 101600789 A | 12/2009 |
| DE | 3343134 A1 | 6/1985 |
| DE | 4029620 A1 | 4/1992 |
| DE | 4428617 A1 | 2/1996 |
| DE | 19741242 C1 | 7/1999 |
| GB | 937782 A | 9/1963 |
| WO | WO-0058223 A1 | 10/2000 |

OTHER PUBLICATIONS

Search Report for EP11164304 mailed Nov. 14, 2011.
Search Report for DE 102010038319.8, dated Mar. 10, 2011.
Chinese Examination Report 2011102153510 Dated Jul. 22, 2013.

* cited by examiner

*Primary Examiner* — Steven Leff
(74) *Attorney, Agent, or Firm* — Marshall, Gerstein & Borun LLP (57) ABSTRACT

A method and a device for leading media in a thermal treatment system for a liquid product where, determining the led-in volume of the expelling medium while a medium is being expelled from the treatment system and by setting the determined volume of the expelling medium in a ratio to a nominal capacity of the treatment system, the shutting off of a product pipe on the outlet side following a medium change on the inlet side can be accomplished independent in time of the performance of the medium change on the inlet side. This reduces product losses and permits the treatment of residual amounts remaining in the treatment system.

22 Claims, 9 Drawing Sheets

METHOD AND DEVICE FOR LEADING MEDIA THROUGH A TREATMENT SYSTEM FOR A LIQUID PRODUCT

CROSS-REFERENCE TO RELATED APPLICATION

The present application claims the benefit of priority of German Application No. 102010038319.8, filed Jul. 23, 2010. The entire text of the priority application is incorporated herein by reference in its entirety.

FIELD OF THE DISCLOSURE

The disclosure relates to a method and a device for leading media through a treatment system, in particular through a thermal treatment system, for a liquid product, in particular a beverage.

BACKGROUND

Systems for the thermal product treatment of beverages usually have a capacity of about 1,000-5,000 liters. Experience shows that a product quantity at least corresponding to the capacity of the treatment system is required for a successful product treatment. For example, residual amounts at the end of a production batch which are smaller than the capacity of the treatment system cannot be processed. It is neither possible to treat a batch that is smaller than the capacity of the treatment system. However, it would be desirable to be able to utilize as much as possible of the product to be treated.

Moreover, during a medium change on the inlet side, for example when the product to be treated has completely flown into the treatment system and the product still present in the treatment system is expelled with water, it is common to switch the product outlet depending on the state. Thus, in the worst case, a product quantity corresponding to the capacity of the treatment system is lost at the end of the treatment. Therefore, there is a demand to reduce product loss during a medium change.

Moreover, a product return pipe which is provided for circulating the product in case of a standstill of a downstream production unit is usually filled already at the beginning of the treatment before the treated product is forwarded for intermediate storage. However, this requires that the product return pipe is also filled in case of a trouble-free operation of the downstream production system, although this would not be necessary with respect to production. The treated product led into the product return pipe must then be rejected after treatment. It would be desirable to minimize this product loss, too.

Another problem with the medium change in a thermal product treatment system arises in systems in which a degassing apparatus is integrated. During a medium change, the product flow at the degassing apparatus is usually interrupted, so that the medium present in a heat exchanger upstream of the degassing apparatus will dwell therein for an undesired long time and will be excessively heated. This will impair product quality. Moreover, the degassing apparatus must be subsequently refilled at a highly increased flow rate, resulting in a reduced thermal absorption of the medium passed through it, which in turn can have a negative influence on product quality, for example due to a reduced effectiveness of degassing.

Therefore, there is a demand for a method and a device by means of which the above mentioned problems can be moderated or even eliminated.

SUMMARY OF THE DISCLOSURE

The solution for this demand is achieved with a method according to the present disclosure, where a first method comprises the following steps: a) expelling a first aqueous medium from the treatment system through a product pipe on the outlet side with the aid of a second aqueous medium, wherein the volume of the second aqueous medium led into the treatment system in the process is determined, in particular in the form of a continuous volume count: and b) shutting off the product pipe on the outlet side, so that the second aqueous medium cannot flow into the product pipe, wherein a trigger for shutting off the product pipe on the outlet side is calculated on the basis of the volume determined in step a) and a nominal capacity of the treatment system. It is thereby possible to decouple in time the process of shutting off the product pipe on the outlet side from the process of leading in the second aqueous medium. Thus, the advance of the second aqueous medium into the intermediate storage can be followed up and the product pipe on the outlet side can be shut off before the second aqueous medium fills the latter. The point in time for shutting off can thus be controlled. Correspondingly, the first aqueous medium can be led out through the product pipe on the outlet side and utilized until the second aqueous medium reaches the product pipe on the outlet side.

The above-noted demand is furthermore achieved with a modified or second disclosed method in which step b) is replaced by a step c), in which the product pipe on the outlet side is opened so that the second aqueous medium can flow into the product pipe, where a trigger for opening the product pipe on the outlet side is calculated on the basis of the volume determined in step a) and a nominal capacity of the treatment system. Thereby, the advance of the second aqueous medium through the treatment system can be followed up, so that the product pipe on the outlet side can be opened directly after a point in time at which the first aqueous medium has been led out of the treatment system. The second aqueous medium can thus be purposefully forwarded to further production and it can be prevented that the first aqueous medium is led into the downstream production system. Thus, the opening of the product pipe on the outlet side can also be decoupled in time from a medium change on the inlet side.

Preferably, in the first method according to the disclosure, the first aqueous medium is the product, and the second aqueous medium is water. Thus, the final portion of a treated product batch can also be supplied to a subsequent product unit, such as an intermediate storage tank, with little product losses. One can simultaneously prevent water from being led into the downstream production unit.

Preferably, in the second disclosed method, the first aqueous medium is water, and the second aqueous medium is the product. Thus, the front end of a treated product batch can also be forwarded to a downstream production unit, such as an intermediate storage tank, with little product losses.

In an advantageous embodiment of the method, the led in volume of the product is smaller than the nominal capacity of the treatment system. The treatment system can thus be particularly flexibly used in that even very small batches can be treated. This is possible, for example, by expelling water from the treatment system with product corresponding to the second disclosed method, and in turn expelling the product with water according to the first disclosed method. By a combination of the first and the second methods according to the disclosure, one can thus particularly efficiently treat a treated product and reliably separate it from the expelling water.

Preferably, by a change of the medium supply from the first aqueous medium to the second aqueous medium at a certain point of the product supply, a volume measurement of the second aqueous medium led into the treatment system is started. Thereby, volume measurement can be started particularly effectively and in a simple manner. Thus, the advance of the second aqueous medium through the treatment system can be followed up independent of a change of the operating state of the treatment system.

Preferably, a first marker assigned to a change of the medium supply is generated if the second aqueous medium is the product, and/or a second marker is generated if the second aqueous medium is water to assign the start of volume measurement to the respective medium. Thereby, one can assign a marker, for example, to the front end and the rear end of a product batch within the treatment system to localize the front end and/or the rear end of the product batch along the product flow within the treatment system.

In a particularly advantageous embodiment, the volume determined in step a) is compared to the nominal capacity of the treatment system, or a ratio of the determined volume and the nominal capacity is calculated to determine the position of a transition area each from the first to the second aqueous medium in the treatment system. This is in particular a position based on the direction of the product flow, for example a pipe section of the treatment system. Thereby, the product pipe on the outlet side can be shut off or opened before the transition area reaches the product pipe. Correspondingly, one can reliably avoid that water is forwarded into a downstream production unit, and/or that a considerable proportion of the treated product must be rejected.

Preferably, a supply rate to a degassing unit provided in the treatment system is furthermore set to be lower than a discharge rate away from the degassing unit, in particular in case of a medium change, in order to lower the filling level of the first aqueous medium in the degassing unit to a given minimum value at a point in time when the second aqueous medium starts to flow into the degassing unit. One can avoid thereby that supply must be interrupted during a medium change to permit to empty the degassing unit. Thus, overheating of the following medium in the entrance area of the degassing unit can be prevented. Preferably, the supply rate can be set to be 1 to 20% lower than the discharge rate.

Preferably, the supply rate is furthermore set to be higher than the discharge rate when the second aqueous medium flows into the degassing unit to raise the filling level of the second aqueous medium to a desired filling level. Thereby, the filling level can be uniformly raised without having to supply the second aqueous medium at an undesired high supply rate and thereby reducing the effectiveness of degassing. Thus, non-sufficient heating of the following medium in the entrance area of the degassing unit can be moreover prevented. Preferably, the supply rate is set to be 1 to 20% higher than the discharge rate.

A particularly advantageous embodiment of the method furthermore comprises a step d) following step c), wherein: the product flows through the treatment system; a first operating state is defined by a state before a first interruption of the product flow in a downstream production system; a second operating state is defined by a state after the first interruption of the product flow in the downstream production system; a product return pipe of the treatment system is filled with water in the first operating state; the water is expelled with the product when the product flow is interrupted; and the product return pipe is filled with product in the second operating state.

One can thereby prevent the product return pipe from having to be filled with product while the treatment system can be orderly operated in the first operating state. In other words, the product return pipe is only filled with product in a downstream production system when the product flow is interrupted. One can thereby prevent the product from coming to a stand in the treatment system when a downstream production unit is standing still. Thus, overheating of the product in heat exchangers of the thermal treatment system can be avoided. One can thus avoid that product must be unnecessarily rejected.

Preferably, a marker is assigned each to the first and the second operating state to either first expel water from the product return pipe or return product in case of an interruption of the product flow in the downstream production system. Thus, when the return pipe is filled with product, one can immediately change over to a product return when a missing product request is detected.

The above-noted demand is furthermore achieved with a device according to the disclosure, where the device comprises: a volume measuring means for measuring a liquid volume conveyed through the treatment system; a product pipe on the outlet side for forwarding the treated product towards a downstream production unit, in particular an intermediate storage tank; a shut off means for shutting off or opening the product pipe on the outlet side; an evaluation means adjusted to compare at least one measuring result of the volume measuring means with a nominal capacity of the treatment system; and a trigger device which can set the shut off means to an opened or closed state depending on the comparison in the evaluation means.

The shut off means can thus be actuated independent of the change-over means. The advance of the first or the second medium through the treatment system can be followed up independent of the switching state of the change-over means. In particular, the point in time of shutting off or opening the shut off means can be optimized depending on the respective capacity of the treatment system. On the one hand, the product can be forwarded to a downstream production unit with little product losses, on the other hand, one can avoid that water for expelling the product reaches the subsequent production unit.

A particularly advantageous embodiment of the device furthermore comprises a signal generator for generating a marker assigned to a change of the medium supply into the treatment system. It is thereby possible to determine a product or water volume with a continuously running volume counter. By the marker, one can in particular start a counter coupled to the volume measuring means. Upon actuation of the shut off means on the outlet side, the counter can be reset to zero.

Preferably, the treatment system comprises a degassing unit, a first pump arranged in the product flow upstream of the degassing unit, and a second pump arranged in the product flow downstream of the degassing unit, where furthermore a control means is provided which can adjust the conveying rate of the first pump in response to a filling level in the degassing unit and/or in a container upstream of the degassing unit. It is thereby possible to continuously empty the degassing unit when a medium change is planned without interrupting the product flow through the degassing unit, in particular through a heat exchanger upstream of the degassing unit, to avoid an undesired negative influence on product quality in particular by overheating the product in case of a standstill of the product flow. As an alternative, the conveying rate of the second pump could also be adjusted, or else both conveying rates.

BRIEF DESCRIPTION OF THE DRAWINGS

Preferred embodiments of the disclosure are represented in the drawing. In the drawings.

DETAILED DESCRIPTION OF THE PREFERRED EMBODIMENT

Figure 1A:
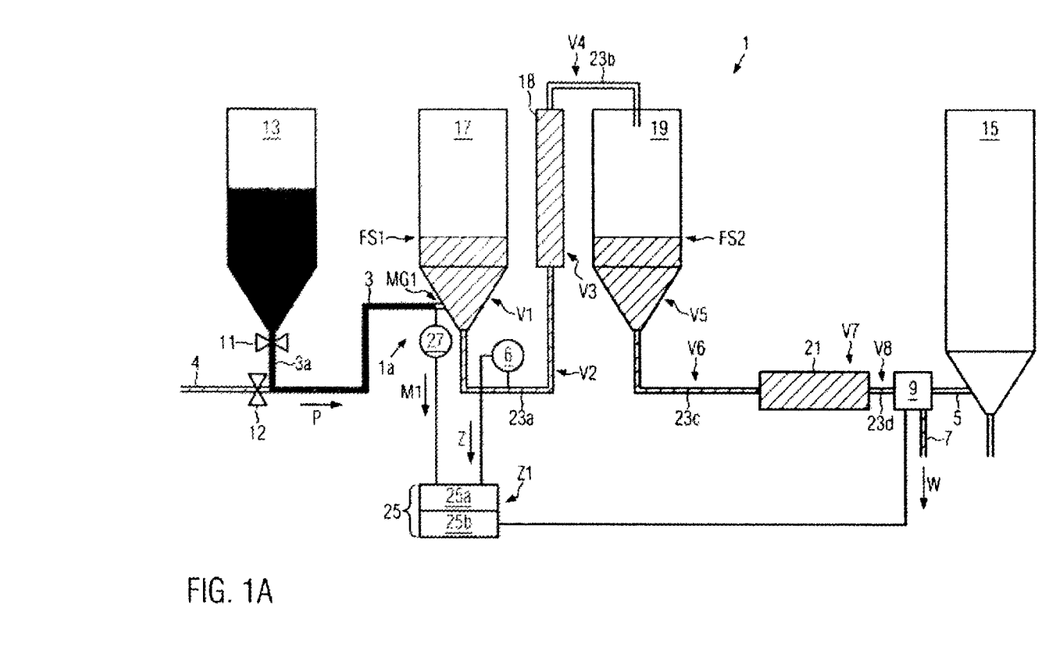
FIG. 1A shows a schematic representation of a first embodiment of the device according to the disclosure in an operating state at the beginning of the introduction of a product into a thermal treatment system.

As can be seen in FIG. 1A, the first embodiment of the device according to the disclosure for leading media through a thermal treatment system 1 comprises a product pipe 3 on the inlet side, a water supply pipe 4 on the inlet side ending in the product pipe 3, a product pipe 5 on the outlet side, a volume measuring means 6, for example a volume counter, a water outlet 7 on the outlet side and a shut off means 9 on the outlet side for opening or shutting off the product pipe 5 on the outlet side and for opening or shutting off the water outlet 7. However, a separate shut off means could also be provided for the water outlet 7. Suited valves, flaps or the like for realizing the shut off means 9 are well-known and therefore not described more in detail. At the medium supply pipes 3, 4, associated shut-off means 11, 12 are furthermore indicated.

A product container 13 is connected at a section 3a of the product pipe 3 on the inlet side. The water outlet 7 for example leads into a water circuit or into a gully. Corresponding junctions can also be provided at the product pipe 3 on the inlet side, but they are irrelevant for the functioning of the device according to the disclosure and therefore not represented. Furthermore, a buffer tank 15 on the outlet side is indicated which is arranged between the product pipe 5 on the outlet side and a downstream production unit, for example a filling machine.

In the shown example, the thermal treatment system 1 comprises a medium discharge tank 17 of a medium connection unit, a preheating unit 18, a degassing unit 19, a thermal treatment unit 21 and connection pipes 23a to 23d for connecting the treatment system 1 to the shut off means 9 on the outlet side and for interconnecting the medium discharge tank 17, the preheating unit 18, the degassing unit 19 and the thermal treatment unit 21. The thermal treatment unit 1 has a nominal capacity VB which is composed of the volumes V1 to V8 of the connection pipes 23a to 23d of the medium discharge tank 17, the preheating unit 18, the degassing unit 19 and the thermal treatment unit 21, as indicated in FIG. 1A. Here, in particular volumes V1 and V5 are nominal volumes which are defined by the desired filling levels FS1 and FS2 in the medium discharge tank 17 and the degassing unit 19.

The first embodiment of the device according to the disclosure furthermore comprises an evaluation means 25a and a trigger device 25b which, in the shown example, are combined in an arithmetic unit 25, where a first input of the evaluation means 25a is connected to a signal generator 27 arranged at the inlet 1a of the treatment system 1 to receive from it a first marker signal M1 in case of a medium change on the inlet side to a first medium, and a second marker signal M2 in case of a change to a second medium. A second input of the evaluation means 25a is connected to the volume measuring means 6 to receive from it a counter reading Z, preferably as continuously up-dated and transmitted measuring signal. The volume measuring means 6 can be, for example, a volume counter of a known design whose counter reading Z is continuously increased by the flow in the connection pipe 23a on the inlet side, independent of the type of the introduced medium.

The signal generator 27 can comprise, for example, a measuring means which can detect different media flowing past it. The basis for this can be, among other things, a measurement of the conductivity, a sugar content, a pH value or optical properties and the absorption behavior of the respective medium. The signal generator 27 could, however, also be integrated in the arithmetic unit 25. It could also be, for example, triggered manually or be coupled to change-over operations and flow measurements in the respective medium supply pipes on the inlet side. This could be, for example, the opening of the section 3a of the product pipe 3 on the inlet side, where the product from the product container 3 then flows away at a known speed and reaches the treatment system 1 at a point in time that can be calculated. It is decisive that separate marker signals M1, M2 for subsequent medium changes and the associated medium boundaries MG1, MG2 flowing into the treatment system 1 can be generated.

The evaluation means 25a is preferably designed such that it can assign one counter reading Z of the volume measuring means 6 each to the first marker M1 and the second marker M2. Correspondingly, a counter reading Z or another measured volume value of the volume measuring means 6 can be assigned to a medium change at the entrance 1a of the treatment system 1. Correspondingly, a first counter Z1 can be assigned to the first portion of the second medium or the final portion of the first medium in case of a changeover from the first to the second aqueous medium on the inlet side. A second counter Z2 can be started in a corresponding manner at the next medium change on the inlet side. It will be understood that the counters Z1, Z2 can be set to zero in a suited manner every time before a new start, for example by actuating the shut off means 9 on the outlet side, to be then incremented, while measurement is running, by continuously transmitting a measuring signal or a counter reading Z of the volume measuring means 6 in the evaluation means 25a.

Thereby, the volume of the aqueous medium flowing into the treatment system 1 between two subsequent medium changes can be continuously detected and compared to the nominal capacity VB of the treatment system 1. Thus, a state in which the flown-in volume VP of a product P or the volume VW of water W determined by means of the volume measuring means 6 is as high as the nominal capacity VB of the treatment system 1 describes a complete filling of the treatment system 1 with the introduced product P or water W, or a state in which a medium change at the shut off means 9 on the outlet side is to be triggered.

It will be understood that a medium change on the inlet side both from the product P to water W as well as from water W to the product P is possible. This circumstance is taken into consideration by generally denoting the aqueous medium introduced before the medium change on the inlet side, that means the medium to be expelled, as the first aqueous medium, and the medium introduced after the change-over operation, that means the expelling medium, as the second aqueous medium.

The trigger device 25b sends a first trigger signal TS1 for opening, or a second trigger signal TS2 for closing the shut off means 9 on the outlet side to the evaluation means 25a in response to a calculation result of the latter. The opening or closing of the shut off means 9 on the outlet side is thus not accomplished directly depending on a change-over of the medium supply, for example the shut off means 11, 12, but depending on a volume measurement with the volume measuring means 6 triggered in case of a medium change at the inlet 1a of the treatment system 1.

If it is detected, on the basis of the calculation of the evaluation means 25a, that the treated product P has reached the shut off means 9 on the outlet side, the latter is opened. If it is on the other hand detected that water W flown through the treatment system 1 reaches the shut off means 9 on the outlet side, the latter is shut off to prevent water W from getting into the product pipe 5 on the outlet side. Correspondingly, the shut off means 9 on the outlet side is opened not before only product P, but no more water W comes flowing in. The functioning of the device according to the disclosure will be explained hereinafter with reference to FIGS. 1A-1F, starting with the expelling of water W from the treatment system 1 by means of the following product P, followed by the thermal treatment of the product P in the treatment system 1, and finally followed by the expelling of the product P from the treatment system 1 with following water W.

Before the product P is introduced for the first time, the water supply pipe 4 is preferably connected to the treatment system 1, and the complete treatment system 1 is in particular filled with water W. This state is not represented in the drawing.

FIG. 1A shows a condition at the beginning of the introduction of the product P. Upon opening the shut off means 11 and closing the shut off means 12, the product P to be treated flows out of the product container 13 into the product pipe 3. As soon as the medium boundary MG1 between water and product reaches the entrance 1a of the treatment system 1, here approximately coinciding with the position of the signal generator 27, a marker signal M1 is transmitted to the evaluation means 25a. Simultaneously, the volume measuring means 6 transmits a counter reading Z to the evaluation means 25a, and a counter Z1 assigned to the product front end is started, and thus the volume measurement of the product P flowing in is started.

Figure 1B:
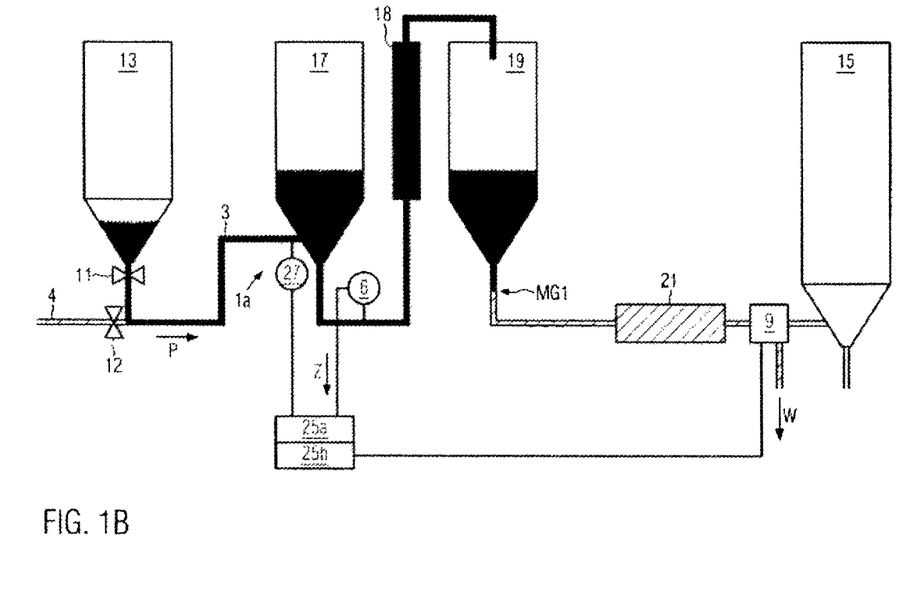
FIG. 1B shows the arrangement of FIG. 1A while the product is being introduced.

In FIG. 1B, a portion of the product P to be treated is already located in the treatment system 1 up to the medium boundary MG1. The remaining product volume is, at this point in time, still located in the product container 13 and in the product pipe 3 on the inlet side. A portion of the treatment system 1, in FIG. 1B in particular the thermal treatment unit 21, is still filled with water W. For better distinction, the product P is represented as a black filling, while the water W is represented as filling shown in dotted lines in the figures. In the state shown in FIG. 1B, the counter Z1 has risen to a value corresponding to the position of the medium boundary MB1 and the volume of the product P that has flown into the treatment system 1.

Figure 1C:
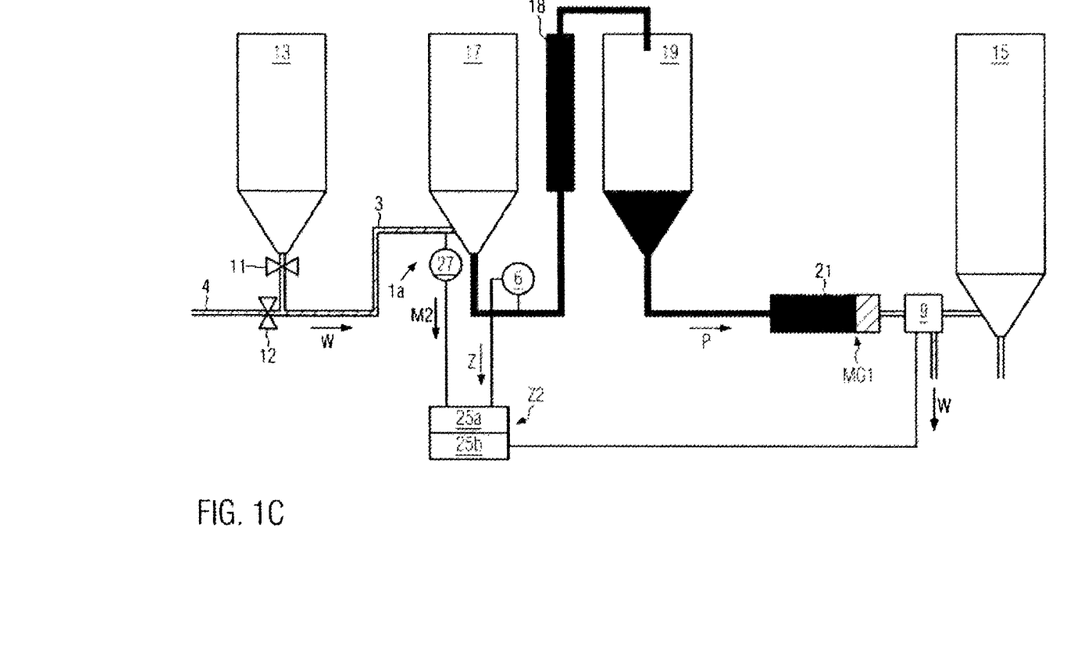
FIG. 1C shows the arrangement of FIG. 1A during a medium change on the inlet side after the product has been completely led into the thermal treatment system.

FIG. 1C shows a state during a medium change at the entrance 1a of the treatment system 1 after the product P has completely flown into the treatment system 1 and after the shut off means 12 has been opened, so that instead of the product P, now water W can flow in from the water pipe 4 on the inlet side to push the product P through the treatment system 1. During the medium change at the entrance 1a of the treatment means 1, a second marker M2 is generated which is linked to a counter reading Z of the volume measuring means 6 to start the second counter Z2 and mark the rear end of the product P or the front end of the following water W. Starting from the nominal volume VB of the treatment system 1, this medium boundary can also be followed up while it is flowing through the treatment system 1, and it can be determined when the following water W reaches the shut off means 9 on the outlet side.

Figure 1D:
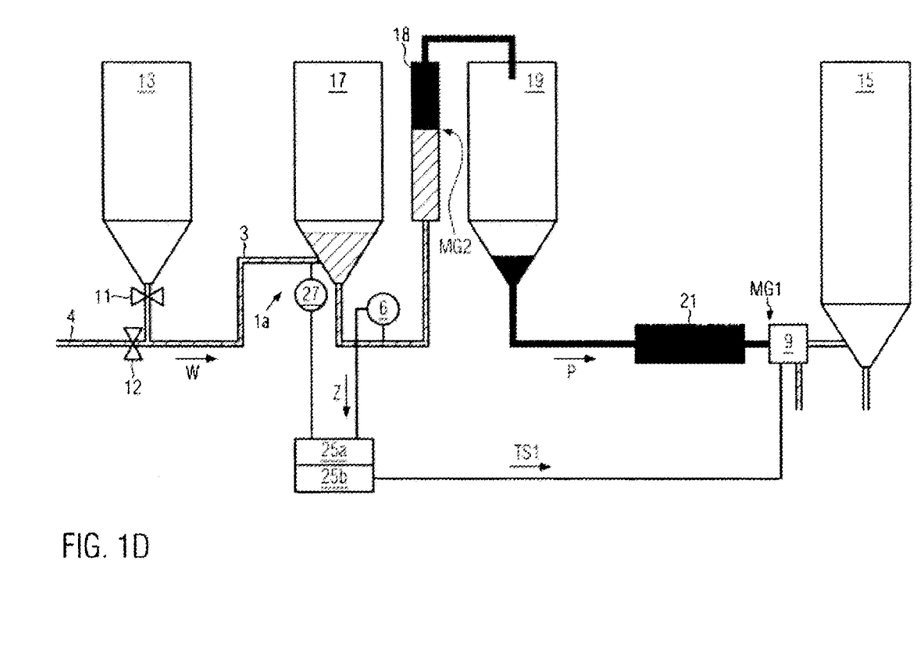
FIG. 1D shows the arrangement of FIG. 1A in an operating state in which the treated product is expelled with water and reaches a shut off means on the outlet side.

In FIG. 1D, a state is represented in which the treated product P reaches the shut off means 9 on the outlet side. In the example, a portion of the treatment system 1 is already filled with following water W. The medium boundary MG2 corresponding to the second medium change is here indicated by way of example in the preheating unit 18. On the basis of the counter Z1 and the nominal volume VB of the treatment system 1, a point in time for switching the shut off means 9 on the outlet side can be determined. This point in time is determined on the basis of the volume VP that has flown in since the counter Z1 was started, and it is independent in time of the subsequent medium change at the entrance 1a of the treatment system 1. The trigger unit 25b sends the trigger signal TS1 to the shut off means 9 to open the latter when the complete volume flown in after the marker M1 had been set is as high as the nominal capacity of the treatment system 1. One can assume that the complete water W that was present in the treatment system 1 before has been expelled and only product P can flow through the opened shut off means 9 into the product pipe 5 on the outlet side.

Figure 1E:
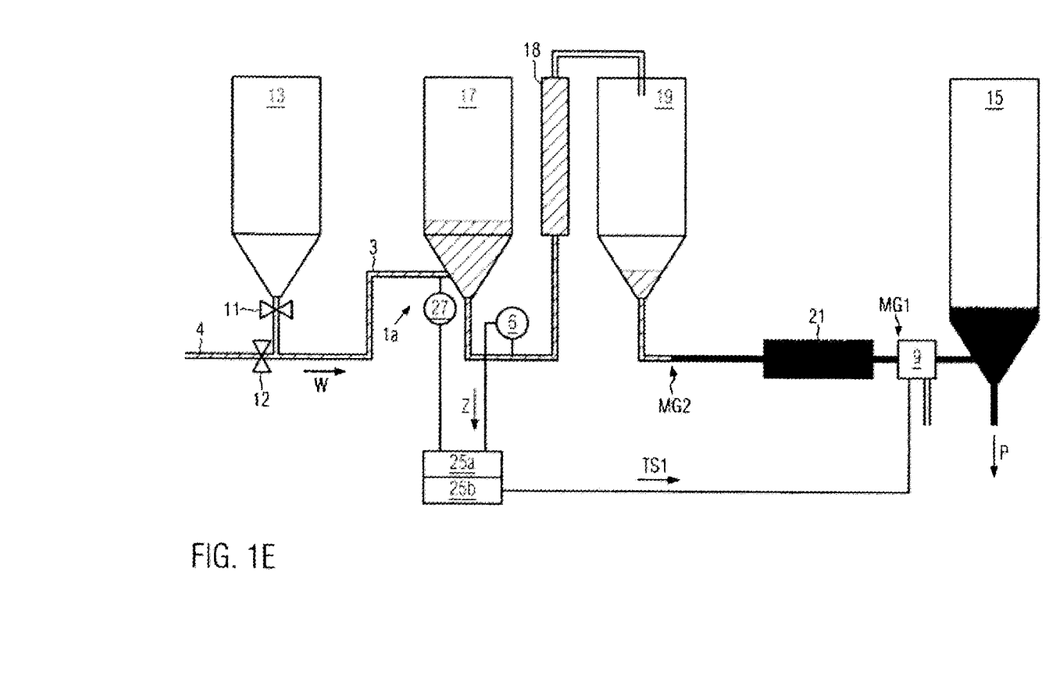
FIG. 1E shows the arrangement of FIG. 1A in an operating state in which the treated product is further expelled and forwarded to a downstream production unit.

FIG. 1E shows a state in which the product P is introduced through the opened shut off means 9 and the product pipe 5 on the outlet side into the downstream buffer container 15 and is forwarded from it to a downstream product unit, for example a filling machine. The first counter Z1 is not required in this state and can be reset to zero. The second counter reading Z2 is still being monitored to determine when the medium boundary MG2, that means the product rear end and the front end of the water W pushing behind it, reaches the shut off means 9 on the outlet side.

Figure 1F:
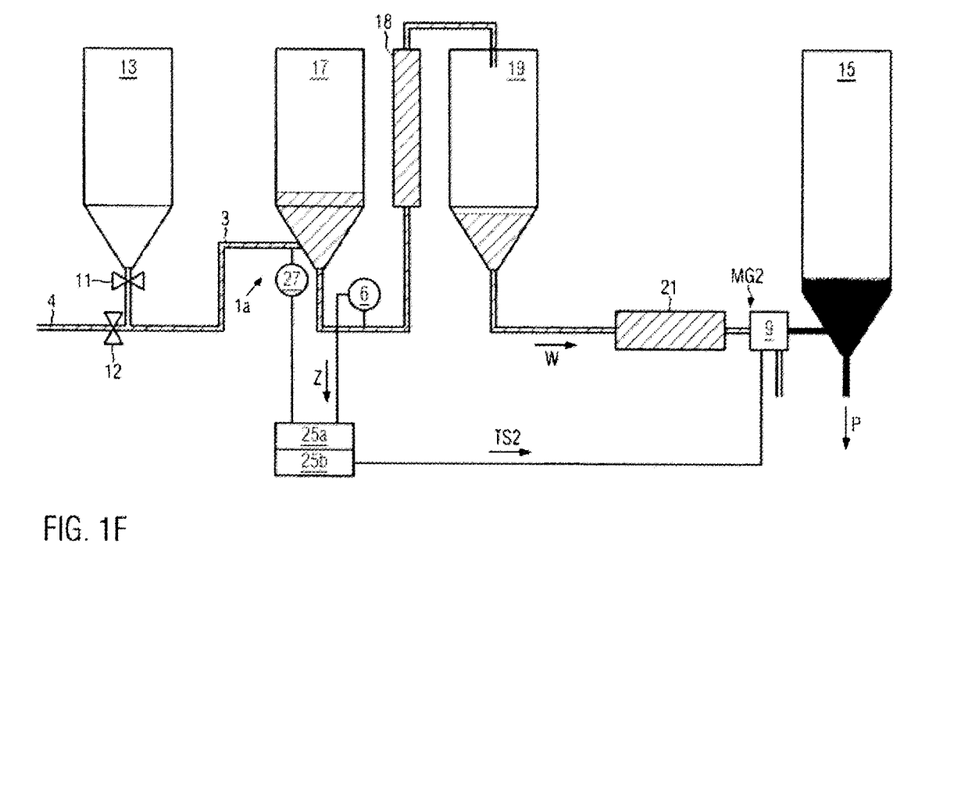
FIG. 1F shows the arrangement of FIG. 1A in an operating state in which the product has been completely expelled from the thermal treatment system with water.

FIG. 1F shows a state in which the product P has been completely expelled from the treatment system 1 and the water W pushing behind it has reached the shut off means 9 on the outlet side. At a point in time when the water volume VW flown in and measured with the counter reading Z2 is as high as the capacity VB of the treatment system 1, the trigger device 25b sends the trigger signal TS2 to the shut off means 9 on the outlet side to close it. It is thereby prevented that the following water W can flow into the product pipe 5 on the outlet side. Instead, the following water W is conveyed into the water pipe 7 on the outlet side. After a defined rinsing amount, the counter Z2 can also be reset to zero and the water supply through the pipe 4 can be interrupted. Now, another medium change could be initiated as described in connection with FIG. 1A.

The setting of separate markers M1, M2 and the assignment of the markers M1, M2 to counter readings Z of the volume measuring means 6, where different desired counter readings can be predetermined depending on the system and the situation, permit the independent following up of two subsequent medium boundaries MG1, MG2 which are each caused by a medium change on the inlet side, where in particular the front end of the respective expelling medium can be localized along the product flow with the aid of the first or second counter Z1, Z2.

Thus, the shut off means 9 can be purposefully opened and closed again to convey the product P into the product pipe 5 on the outlet side with a minimum product loss, but with the required product safety. Similarly, the front end of the following water W can be followed up through the treatment system 1 to prevent following water W from flowing into the product pipe 5 on the outlet side. The switching operations at the shut off means 11, 12 on the inlet side and the shut off means 9 on the outlet side are decoupled from each other by the described volume measurement. Thereby, the product loss, linked to the required product safety, can be reduced in a medium change on the inlet side.

Figure 2A:
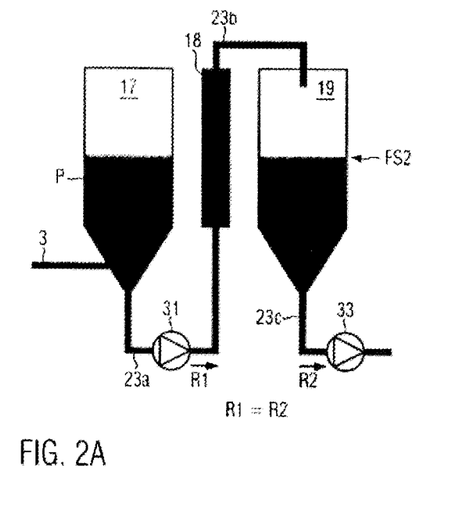
FIG. 2A shows a second embodiment of the device according to the disclosure in an operating state directly before a change-over of the medium supply on the inlet side.

FIGS. 2A-2D show a second embodiment of the device according to the disclosure which is preferably designed as a sub-unit of the first embodiment. The second embodiment of the disclosure, however, could also be designed separate from the first embodiment. Accordingly, with respect to the degassing unit 19, a product pump 31 on the inlet side upstream thereof and a product pump 33 on the outlet side downstream thereof are provided. FIG. 2A here shows a state in which the product P is conveyed from the medium discharge tank 17 via the pump 31 on the inlet side through the preheating unit 18 into the degassing unit 19 and flows away from it via the pump 33 on the outlet side towards the thermal product treatment unit 21 not shown in FIG. 2A. In FIG. 2A, the degassing unit 19 is filled with product P up to the desired filling level FS2. The pump 31 on the inlet side controls the actual filling level F with its conveying rate R1, so that the latter is identical to the adjusted desired filling level FS2.

Figure 2B:
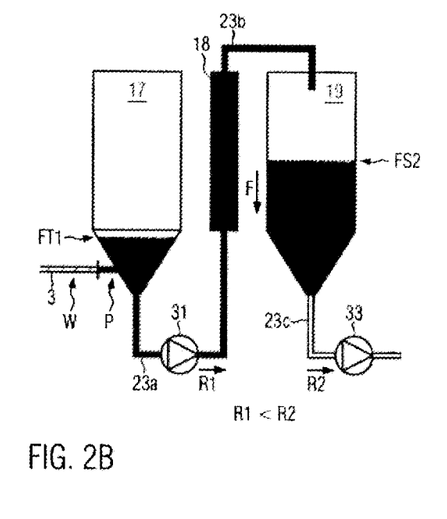
FIG. 2B shows the arrangement of FIG. 2A in an operating state in which the filling level of a first aqueous medium in a degassing unit is continuously lowered.

FIG. 2B shows a state in which the product quantity in the medium discharge tank 17 has already fallen to a lower threshold value FT1 to announce an imminent draining of the medium discharge tank 17. When the threshold value FT1 in the medium discharge tank 17 is reached, the conveying rate R1 of the pump 31 on the inlet side is set to be lower than the conveying rate R2 of the pump 33 on the outlet side. Consequently, the product P is more quickly discharged from the degassing unit 19 than supplied to the latter. Consequently, the filling level F of the product P is continuously reduced in the degassing unit 19 without interrupting the product flow through the connection pipes 23a, 23b and the preheating unit 18. For example, the first conveying rate R1 is set to be lower by 5% to 20% than the second conveying rate R2. The difference between the conveying rates R1 and R2 is calculated and/or adjusted depending on the threshold value FT1 of the filling level F in the medium discharge tank 17 such that the state shown in FIG. 2C is reached.

Figure 2C:
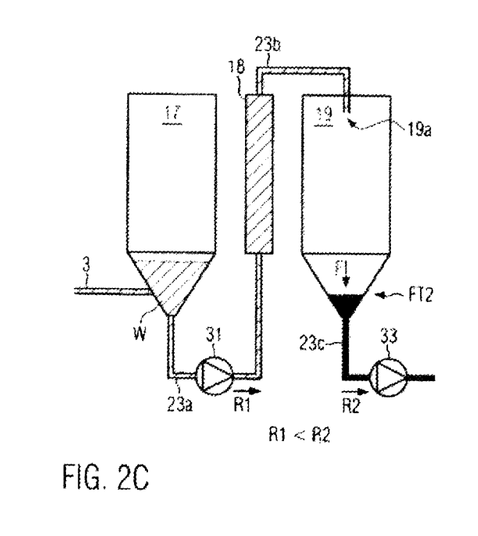
FIG. 2C shows the arrangement of FIG. 2A in an operating state in which the first aqueous medium has reached a minimum filling level in the degassing unit and a second aqueous medium is held ready at the entrance of the degassing unit.

As is illustrated in FIG. 2C, the different conveying rates R1, R2 have the effect that exactly at the point in time when the following water W reaches the inlet 19a of the degassing unit 19, the filling level F of the product in the degassing unit 19 reaches a minimum filling level in the form of a threshold value FT2. Thus, in case of a medium change, a continuous product flow can be maintained in the degassing unit 19. Thereby, overheating of the product P in the heat exchanger 18 upstream of the degassing unit 19 is avoided. The product P can now be completely led out of the degassing unit 19.

Figure 2D:
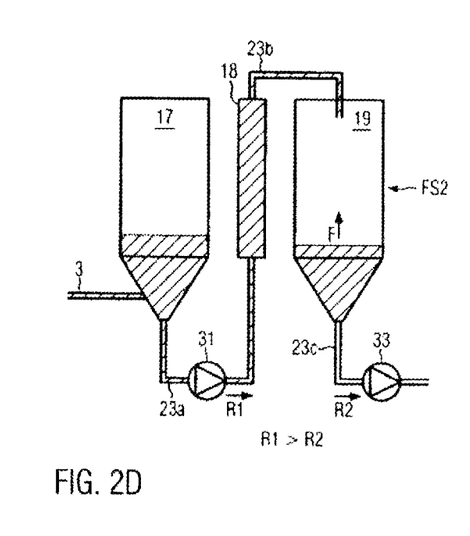
FIG. 2D shows the arrangement of FIG. 2A in an operating state in which the second aqueous medium is conveyed through the degassing unit and its filling level is raised.

FIG. 2D shows a state in which the product P has been completely discharged from the pipes 23a and 23b and from the degassing unit 19. Correspondingly, the pipes 23b and 23c, the preheating unit 18 and the degassing unit 19 are filled with water W. To fill the degassing unit 19 with water up to the desired filling level FS2, the conveying rate R1 of the pump 31 on the inlet side is set to be higher than the conveying rate R2 of the pump 33 on the outlet side. Thus, the filling level F of the water W in the degassing unit 19 can be continuously raised to the desired value FS2 without having to interrupt the water flow through the connection pipe 23c on the outlet side. For example, the conveying rate R1 is here set to be higher by 5% to 20% than the conveying rate R2.

By calculating and/or setting a fixed value of different conveying rates R1, R2 of the pumps 31 and 33 depending on the filling level F in the medium discharge tank 17 and/or in the degassing unit 19, fluctuations in time of the volume flow rate through the area of the degassing unit 19 on the inlet side, in particular through an upstream heat exchanger 18, can be reduced. Thereby, a uniform product quality can be ensured and it can be avoided that overheated product P must be sorted out. Thus, with the second embodiment of the disclosure, one can also reduce product losses.

The conveying rates R1, R2 on the inlet side and on the outlet side can be adjusted, for example, by a predetermined ratio of the conveying rates, or else by continuous adaptation of the conveying rate R1 and/or R2 depending on the filling level F in the medium discharge tank 17 and/or in the degassing unit 19. The pumps 31, 33 and (non-depicted) filling level measuring means at the medium discharge tank 17 and the degassing unit 19 are preferably connected to a control unit which could be, for example, integrated in the arithmetic unit 25.

Figure 3:
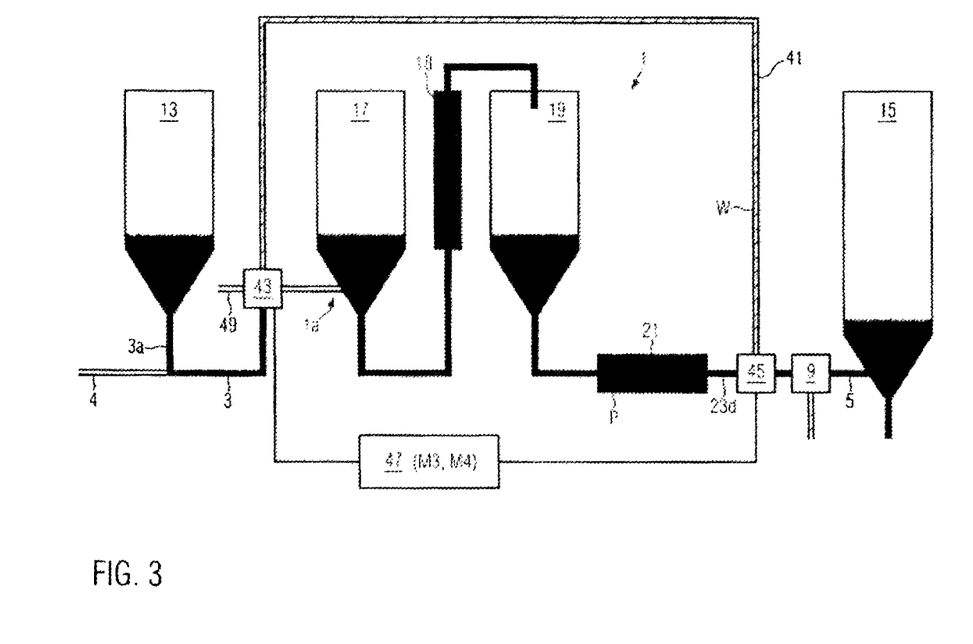
FIG. 3 shows a third embodiment of the device according to the disclosure with a product return pipe.

FIG. 3 shows a third embodiment of the disclosure wherein a product return pipe 41 is provided to circulate a product treated in the treatment system 1 through the return pipe 41 and the treatment system 1 during a standstill of a downstream production unit, for example a product storage tank. It will be understood that the third embodiment of the disclosure can be used separate from the first two embodiments, or else in combination with at least one of the above-mentioned embodiments. The product return pipe 41 can be preferably connected to the entrance 1a and the connection pipe 23d of the treatment system 1 on the outlet side, for example by means of change-over or shut off means 43, 45. The latter could also be integrated in the shut off means 9 on the outlet side.

FIG. 3 shows an operating state in which product P flows through the product pipe 3 on the inlet side, the treatment system 1 and the product pipe 5 on the outlet side at a point in time after the treatment system 1 has been started and before a first standstill has occurred in a downstream production unit, in particular in a product batch tank. As FIG. 3 furthermore illustrates, the product return pipe 41 is filled with water W in this state, while the product P already flows through the product pipe 3 on the inlet side, the treatment system 1 and the product pipe 5 on the outlet side. Consequently, the shut off means 43 and 45 are shut off in the direction of the return pipe 41. In this state, in a control unit 47, which could be, for example, integrated in the arithmetic unit 33 of the first embodiment, a marker M3 is set indicating that the product return pipe 41 is filled with water W.

If a standstill occurs in the downstream production unit, the product P must be circulated through the product return pipe 41 and the treatment system 1. To this end, the shut off means 45 is opened in the direction of the product return pipe 41 and closed in the direction of the product pipe 5 on the outlet side. Simultaneously, the shut off means 43 is opened in the direction of an outlet 49, so that the water W present in the return pipe 41 can be expelled from the same by following product P. When the product return pipe 41 is completely filled with product P, the shut off means 43 can be closed in the direction of the outlet 49 and opened in the direction of the treatment system 1 to circulate the product.

When the standstill in the downstream production unit is over, the shut off means 43, 45 can be shut off again in the direction of the product return pipe 41. Correspondingly, the product P can be conveyed again through the product pipe 3 on the inlet side, the treatment system 1 and the product pipe 5 on the outlet side towards the downstream production unit. Now, another marker M4 is set indicating that the product return pipe 41 is filled with product P. Correspondingly, in a further standstill of the downstream production unit, product P can be circulated directly after the shut off means 43, 45 have been switched.

By the product return pipe 41 remaining filled with water W until a first standstill in a downstream production unit occurs, a product loss can be avoided in those cases where no standstill occurs in the downstream production unit during the treatment of a batch. This method does not give rise to a reduction in product quality as the product P does not even come to a standstill in the treatment unit 1 while the water W is being expelled from the product return pipe 41. The demand-based filling of the product return pipe 41 is advantageous in particular with small product batches. Depending on the size of the system, product return pipes 41 usually have a capacity of 100 to 700 liters. By the method according to the disclosure corresponding to the third embodiment, thus a product quantity corresponding to the capacity of the product return pipe 41 can be saved.

The described embodiments of the disclosure permit a considerable saving of resources and contribute to a reduction in product losses. Apart from the higher product yield, waste water amounts can also be reduced and waste water quality improved. Moreover, thermal fluctuations, in particular in the entrance area of a degassing unit 19, can be reduced.

It is particularly advantageous that residual amounts of treated product P which are smaller than the capacity VB of the thermal treatment system 1 can be utilized completely or nearly completely. Moreover, in contrast to known thermal treatment systems, it is possible to treat product volumes VP which are smaller than the capacity VB of the thermal treatment system 1. This is indicated, for example, in FIGS. 1A to 1F. On the other hand, FIG. 3 shows a product batch which is larger than the capacity VB of the treatment system 1. The shown filling levels of the containers 13, 15, 17 to 19 and 21 only serve for illustration and are not to scale.

What is claimed is:

1. Method of leading media through a thermal treatment system for a liquid product (P), comprising:
   a) expelling a first aqueous medium from the treatment system through a product pipe on the outlet side with a second aqueous medium, wherein a medium boundary between the first aqueous medium and the second aqueous medium is generated and the second aqueous medium pushes the medium boundary and the first aqueous medium downstream of the medium boundary through the treatment system, and wherein the volume of the second aqueous medium led into the treatment system in the process is determined;
   b) shutting off the product pipe on the outlet side, so that the second aqueous medium cannot flow into the product pipe, wherein a trigger (TS2) for shutting off the product pipe on the outlet side is calculated on the basis of the volume determined in step a) and a nominal capacity (VB) of the treatment system; and
   the first aqueous medium is the product (P) and the second aqueous medium is water (W).

2. The method according to claim 1, and by changing over the medium supply into the treatment system from the first aqueous medium to the second aqueous medium, a volume measurement of the second aqueous medium led into the treatment system is started.

3. The method according to claim 2, and a first marker (M1) assigned to a changeover of the medium supply into the treatment system is generated if the second aqueous medium is the product (P), and/or a second marker (M2) is generated if the second aqueous medium is water (W), to assign the start of volume measurement to the respective medium (P, W).

4. The method according to claim 3, and a signal generator generates at least one of the first and second marker (M1, M2).

5. The method according to claim 1, and the volume (VP, VW) determined in step a) is compared to the nominal capacity (VB) of the treatment system, or a ratio to the latter is calculated to determine the position of a transition area from the first to the second aqueous medium in the treatment system.

6. The method according to claim 1, and a supply rate (R1) to a degassing unit provided in the treatment system is set to be lower than a discharge rate (R2) away from the degassing unit, in order to lower the filling level (F) of the first aqueous medium in the degassing unit to a predetermined minimum value (FT2) at a point in time when the second aqueous medium reaches an entrance of the degassing unit.

7. The method according to claim 6, and the supply rate (R1) is set to be higher than the discharge rate (R2) while the second aqueous medium is flowing into the degassing unit in order to raise the filling level (F) of the second aqueous medium to a desired filling level (FS2) in the degassing unit.

8. The method according to claim 6, and the setting of the supply rate (R1) to be lower than the discharge rate (R2) is during a medium change.

9. The method according to claim 1, and the volume of the second aqueous medium is determined in the form of a continuous volume count.

10. The method of claim 1, and the volume is determined in step a) by means of a volume measuring means for measuring a liquid volume led through the treatment system.

11. The method according to claim 1, and the product pipe is shut off in step b) by means of a shut off means for shutting off or opening the product pipe on the outlet side.

12. The method according to claim 11, and a trigger device sets the shut off means to a closed state.

13. The method according to claim 1, and the liquid product is a beverage.

14. Method of leading media through a thermal treatment system for a liquid product (P), comprising:
   a) expelling a first aqueous medium from the treatment system with a second aqueous medium, through a water outlet leading to a water circuit or a gully, wherein a medium boundary between the first aqueous medium and the second aqueous medium is generated and the second aqueous medium pushes the medium boundary and the first aqueous medium downstream of the medium boundary through the treatment system, and wherein the volume of the second aqueous medium led into the treatment system in the process is determined;

c) opening a product pipe on the outlet side, so that the second aqueous medium can flow into the product pipe, where a trigger (TS1) for opening the product pipe on the outlet side is calculated on the basis of the volume determined in step a) and a nominal capacity (VB) of the treatment system; and the first aqueous medium is water (W) and the second aqueous medium is the product (P).

15. The method according to claim 14, and the introduced volume (VP) of the product (P) is smaller than the nominal capacity (VB) of the treatment system.

16. The method according to claim 14, and a step d) following step c), comprising:

the product (P) flows through the treatment system;

defining a first operating state by a state before a first interruption of the product flow in a downstream production system;

defining a second operating state by a state after the first interruption of the product flow in the downstream production system;

filling a product return pipe for returning treated product into an entrance area of the treatment system with water (W) in the first operating state;

expelling the water (W) from the product return pipe by the product (P) when the product flow is interrupted; and filling the product return pipe with product (P) in the second operating state.

17. Method according to claim 16, and one marker (M3, M4) is assigned each to the first and the second operating state to either first expel water (W) from the product return pipe or return product (P) during the interruption of the product flow in the downstream production system.

18. The method according to claim 14, and the volume of the second aqueous medium is determined in the form of a continuous volume count.

19. The method according to claim 14, and the product pipe is opened in step b) by means of a shut off means for shutting off or opening the product pipe on the outlet side.

20. The method according to claim 19, wherein a trigger device sets the shut off means to an opened state.

21. The method according to claim 14, and the liquid product is a beverage.

22. The method of claim 14, and the volume is determined in step a) by means of a volume measuring means for measuring a liquid volume led through the treatment system.

* * * * *